(12) United States Patent
Rosinski

(10) Patent No.: US 11,648,814 B2
(45) Date of Patent: May 16, 2023

(54) ACTUATOR FOR VEHICLE SWAY BAR ENGAGEMENT AND DISENGAGEMENT

(71) Applicant: GHSP, Inc., Holland, MI (US)

(72) Inventor: Ryan David Rosinski, Whitehall, MI (US)

(73) Assignee: GHSP, Inc., Holland, MI (US)

(*) Notice: Subject to any disclaimer, the term of this patent is extended or adjusted under 35 U.S.C. 154(b) by 0 days.

(21) Appl. No.: 17/516,995

(22) Filed: Nov. 2, 2021

(65) Prior Publication Data

US 2022/0144037 A1 May 12, 2022

Related U.S. Application Data

(60) Provisional application No. 63/112,280, filed on Nov. 11, 2020.

(51) Int. Cl.
*B60G 21/055* (2006.01)
*B60G 17/016* (2006.01)

(52) U.S. Cl.
CPC ..... *B60G 21/0556* (2013.01); *B60G 17/0162* (2013.01); *B60G 2202/135* (2013.01); *B60G 2202/42* (2013.01); *B60G 2202/432* (2013.01); *B60G 2800/012* (2013.01)

(58) Field of Classification Search
CPC ............ B60G 21/0556; B60G 17/0162; B60G 2202/135; B60G 2202/42; B60G 21/0553
See application file for complete search history.

(56) References Cited

U.S. PATENT DOCUMENTS

| | | | | |
|---|---|---|---|---|
| 4,660,669 A | * | 4/1987 | Shimizu | B60G 21/0553 180/444 |
| 5,251,926 A | * | 10/1993 | Aulerich | B60G 21/0556 280/124.152 |
| 2009/0058020 A1 | * | 3/2009 | Ersoy | B60G 21/0556 280/5.511 |

(Continued)

FOREIGN PATENT DOCUMENTS

| | | | | |
|---|---|---|---|---|
| DE | 102009054671 A1 | * | 6/2011 | ......... B60G 21/0556 |
| GB | 2220625 A | * | 1/1990 | ........... B60G 21/055 |
| JP | 2005028972 A | * | 2/2005 | ......... B60G 21/0556 |

OTHER PUBLICATIONS

GB2220625 (Year: 1990).*

*Primary Examiner* — Paul N Dickson
*Assistant Examiner* — Kurtis Nielson
(74) *Attorney, Agent, or Firm* — Price Heneveld LLP

(57) ABSTRACT

A sway-bar actuator for a vehicle includes a motor that rotationally operates a lead rod to axially operates a push rod. Operation of the push rod axially operates an attachment fork between an engaged position and a disengaged position. The engaged position is characterized by a unified operation of opposing stabilizing bars. The disengaged position is characterized by independent rotational operation of the opposing stabilizing bars. A sensor rod is coupled to and operates axially with the attachment fork. A sensor assembly has a rotator and a sensor magnet. Axial operation of the sensor rod produces a rotational operation of the sensor magnet. The sway-bar actuator includes an encoder, where a rotational position of the sensor magnet relative to the encoder corresponds to an axial position of the attachment fork and the push rod relative to the engaged and disengaged positions.

14 Claims, 12 Drawing Sheets

(56) References Cited

U.S. PATENT DOCUMENTS

| | | | |
|---|---|---|---|
| 2009/0158868 A1* | 6/2009 | Farmer | F16H 21/24 |
| | | | 74/49 |
| 2011/0101631 A1* | 5/2011 | Pinkos | B60G 17/0162 |
| | | | 280/5.508 |
| 2016/0089951 A1* | 3/2016 | Jeon | B60G 21/0556 |
| | | | 280/5.508 |
| 2017/0120713 A1* | 5/2017 | Drozdowski | B60G 17/0162 |
| 2019/0184784 A1* | 6/2019 | Park | B60G 21/0556 |

* cited by examiner

ACTUATOR FOR VEHICLE SWAY BAR ENGAGEMENT AND DISENGAGEMENT

CROSS-REFERENCE TO RELATED APPLICATION

This application claims priority to and the benefit under 35 U.S.C. § 119(e) of U.S. Provisional Patent Application No. 63/112,280, filed on Nov. 11, 2020, entitled ACTUATOR FOR VEHICLE SWAY BAR ENGAGEMENT AND DISENGAGEMENT, the entire disclosure of which is hereby incorporated herein by reference.

FIELD OF THE DISCLOSURE

The present invention is directed toward vehicle suspension systems, and more specifically, an actuator for engaging and disengaging a sway bar that is attached to a vehicle suspension system.

BACKGROUND

Within vehicle suspension systems, a sway bar is utilized for absorbing certain forces experienced by a vehicle while turning. When a vehicle turns in a certain direction, the vehicle tends to lean or sway toward the outside of the turn. The sway bar operates to manipulate the suspension to decrease or minimize this lean toward the outside of the curve by lowering the suspension of the vehicle nearest the inside of the curve.

SUMMARY OF THE DISCLOSURE

According to a first aspect of the present disclosure, a sway-bar actuator for a vehicle includes a motor that rotationally operates a lead rod. Rotation of the lead rod axially operates a push rod. The sway-bar actuator includes an attachment fork, where operation of the push rod axially operates the attachment fork between an engaged position and a disengaged position. The engaged position is characterized by a unified operation of opposing stabilizing bars, and the disengaged position is characterized by independent rotational operation of the opposing stabilizing bars. A sensor rod is coupled to the attachment fork. The sensor rod operates axially with the attachment fork. A sensor assembly has a rotator and a sensor magnet. Axial operation of the sensor rod produces a rotational operation of the sensor magnet. The sway-bar actuator includes an encoder, where a rotational position of the sensor magnet relative to the encoder corresponds to an axial position of the attachment fork and the push rod relative to the engaged and disengaged positions.

According to another aspect of the disclosure, a sway-bar actuator for a vehicle suspension includes a motor. An attachment fork is coupled with the motor. Rotational operation of the motor is translated to define an axial operation of the attachment fork between an engaged position, where opposing stabilizing bars are rotationally fixed with respect to one another, and a disengaged position, where the opposing stabilizing bars rotationally operate independent of one another. A sensor assembly includes a rotator and a sensor magnet that are coupled with the attachment fork. The axial operation of the attachment fork produces a rotational operation of the rotator and the sensor magnet. The sway-bar actuator includes an encoder, where a rotational position of the sensor magnet relative to the encoder corresponds to an axial position of the attachment fork relative to the engaged and disengaged positions.

According to another aspect of the disclosure, a sway-bar actuator for a vehicle suspension includes a motor that rotationally operates a drive gear. Rotation of the drive gear axially operates a push rod. The sway-bar actuator includes an attachment fork, where operation of the push rod axially operates the attachment fork between an engaged position and a disengaged position that rotationally fixes and rotationally releases opposing stabilizing bars, respectively. An electromagnetic securing assembly includes an electromagnet and a clutch disk in selective communication with the drive gear. Activation of the electromagnet biases the clutch disk against the drive gear and secures the drive gear in a predetermined rotational position, and also selectively secures the attachment fork in one of the engaged position and the disengaged position. A sensor rod is coupled to the attachment fork, where the sensor rod operates axially with the attachment fork. A sensor assembly includes the sensor rod, a rotator and a sensor magnet. The sensor rod operates axially with the attachment fork and wherein axial operation of the sensor rod produces a rotational operation of the rotator and the sensor magnet. The sway-bar actuator includes an encoder, where a rotational position of the sensor magnet relative to the encoder corresponds to an axial position of the attachment fork and the push rod relative to the engaged position and the disengaged position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
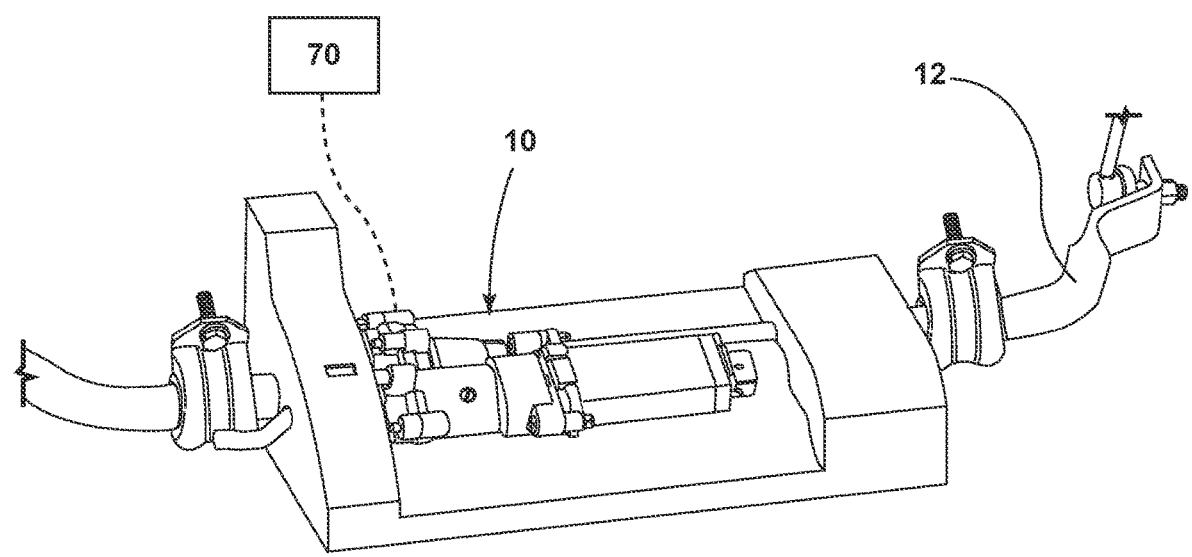
FIG. 1 is a top perspective view of an aspect of a sway-bar actuator engaged with a sway bar for a vehicle.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIGS. 1-14, reference numeral 10 generally refers to a sway-bar actuator that is coupled with a suspension system for a vehicle. The sway-bar actuator 10 engages and disengages the sway bar 12 of the suspension system. According to various aspects of the device, a sway-bar actuator 10 for a vehicle suspension includes a motor 14 that rotationally operates a lead rod 16, sometimes referred to as a lead pin. Rotational operation of the lead rod 16 axially operates a push rod 18. An attachment fork 20 is coupled with the push rod 18, wherein operation of the push rod 18 axially operates the attachment fork 20 between an engaged position 22 and a disengaged position 24. A sensor rod 26 is coupled to the attachment fork 20, wherein the sensor rod 26 operates axially along with movement of the attachment fork 20. A sensor assembly 28 includes a rotator 30 in a sensor magnet 32. Axial operation 82 of the sensor rod 26 produces a rotational operation 80 of the rotator 30 and the sensor magnet 32 of the sensor assembly 28. An encoder 34 is positioned relative to the sensor assembly 28, wherein a rotational position 134 of the sensor magnet 32 relative to the encoder 34 corresponds to an axial position 182 of the attachment fork 20 and the push rod 18 relative to the engaged and disengaged positions 22, 24.

Figure 2:
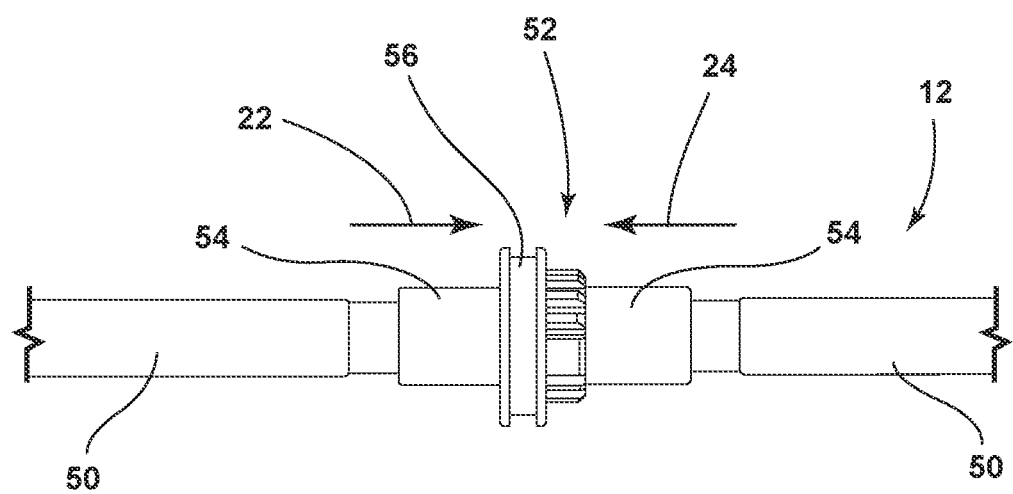
FIG. 2 is a schematic diagram illustrating portions of the disengaging mechanism of the sway bar.
Figure 3:
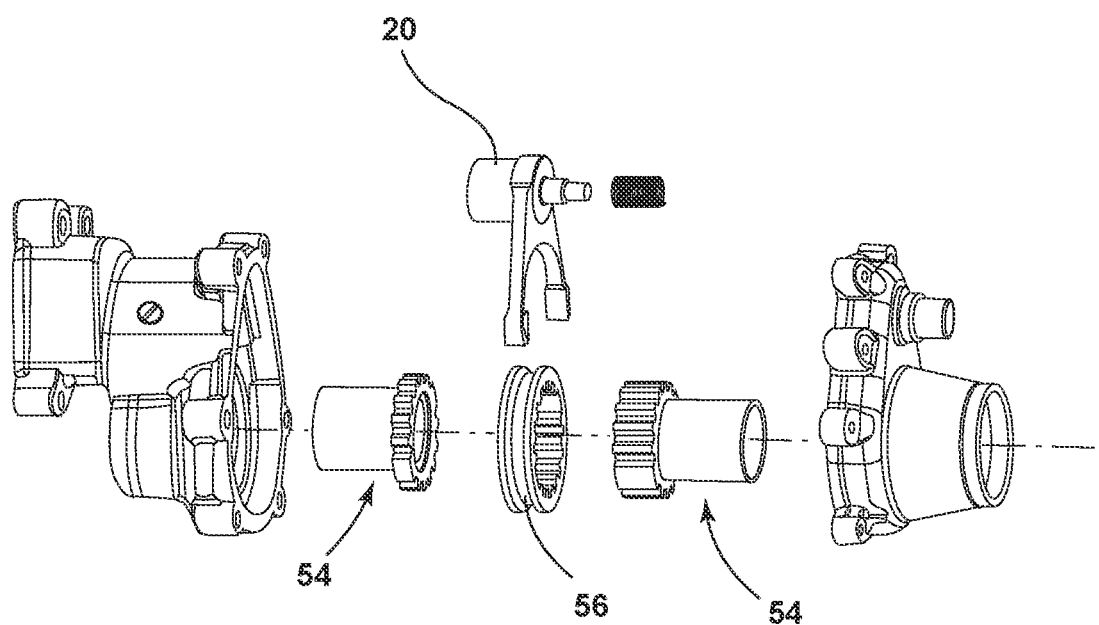
FIG. 3 is an exploded perspective view of an engagement point between the sway bar and the sway-bar actuator.
Figure 4:
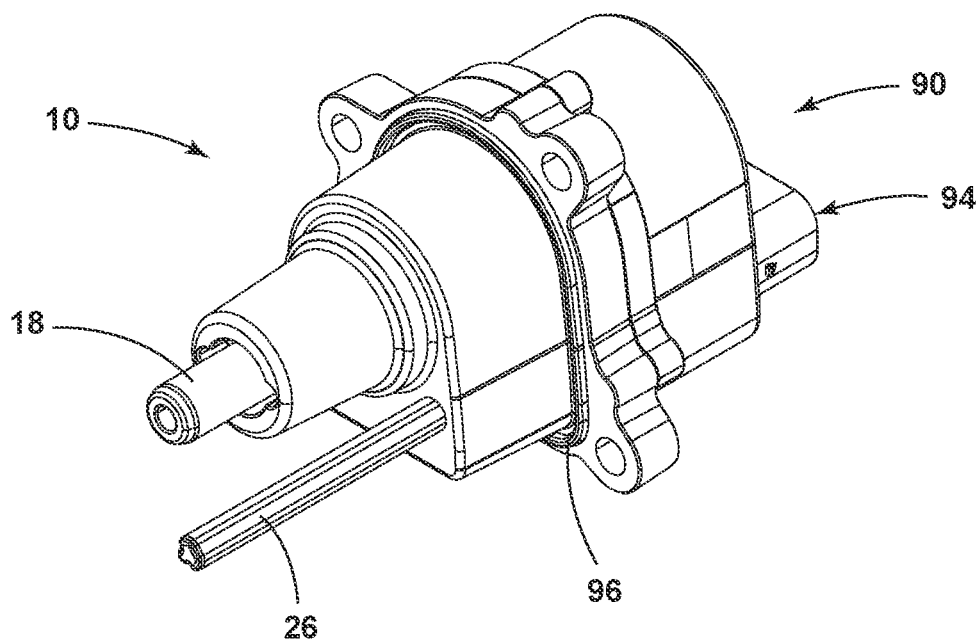
FIG. 4 is a top perspective view of an aspect of the sway-bar actuator.
Figure 5:
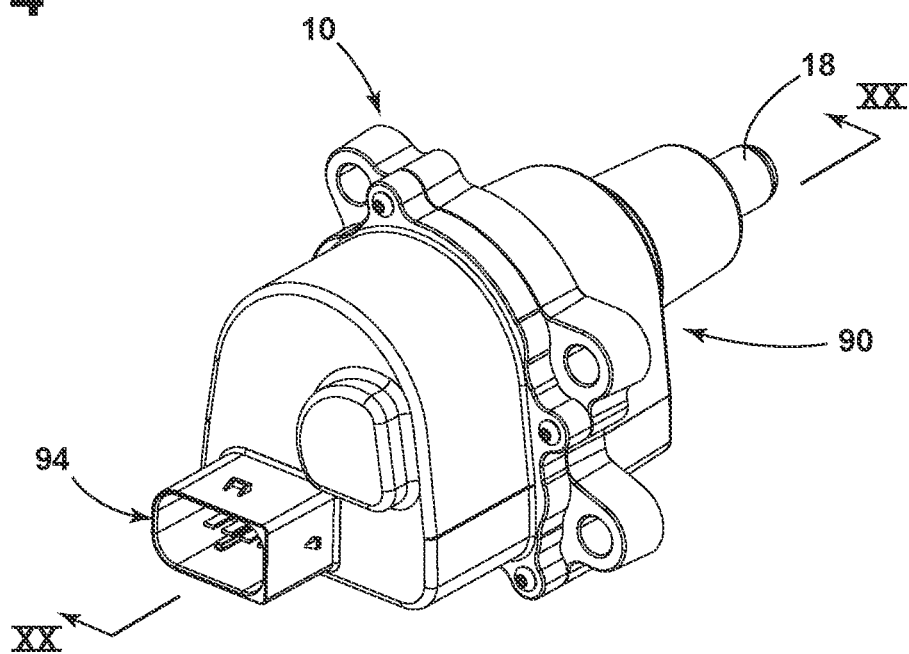
FIG. 5 is another top perspective view of the sway-bar actuator of FIG. 4.
Figure 6:
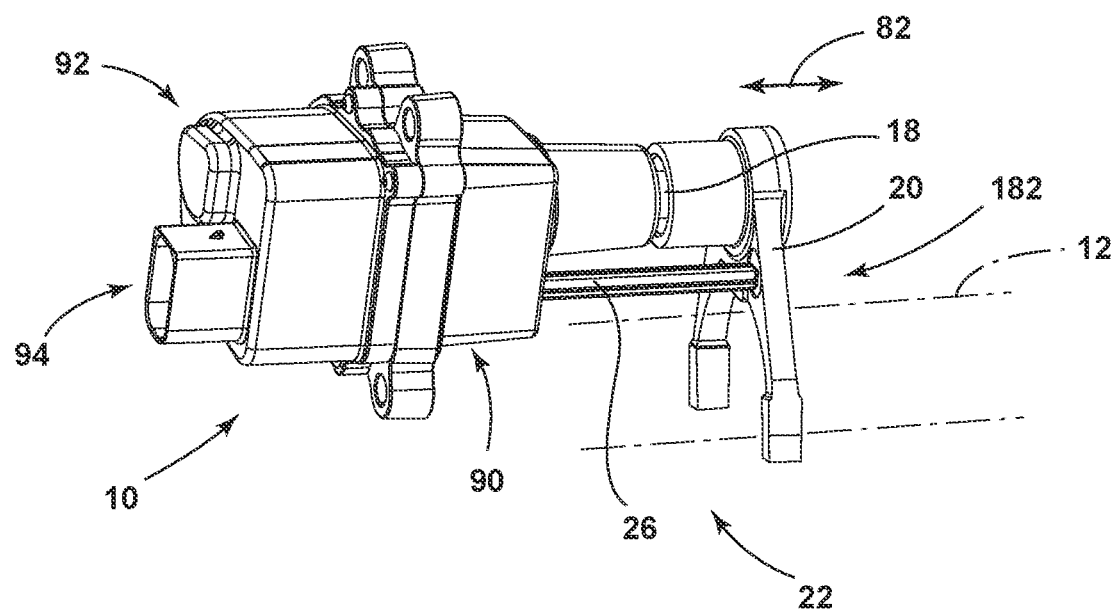
FIGS. 6 and 7 are perspective views of the sway-bar actuator operating between an engaged state and a disengaged state.
Figure 7:
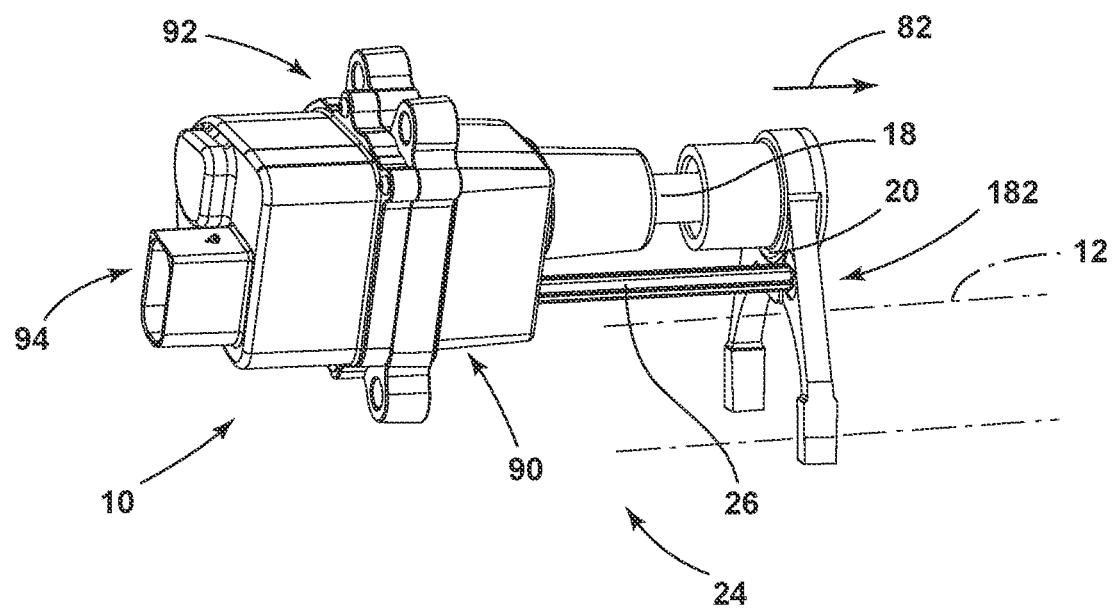
Figure 8:
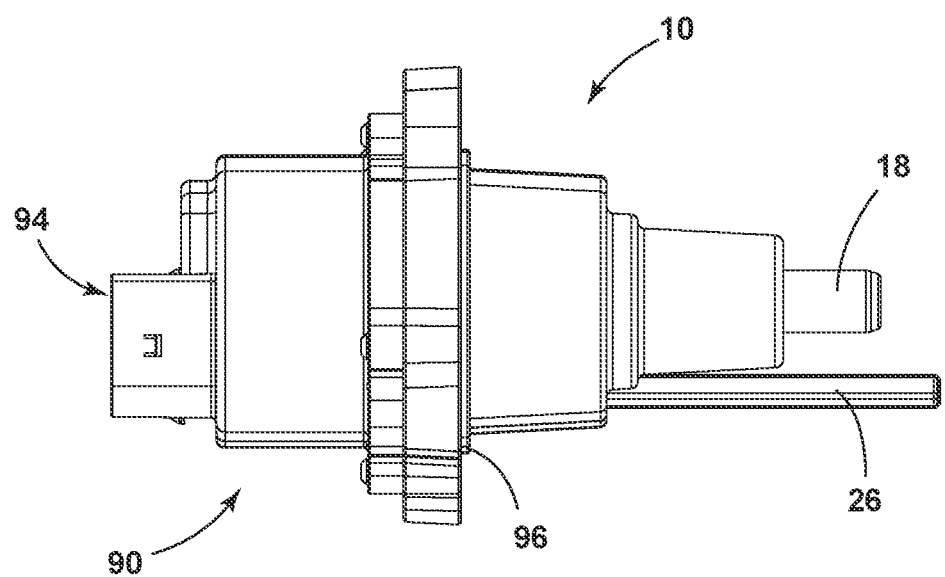
FIG. 8 is side elevational view of the sway-bar actuator of FIG. 4.
Figure 9:
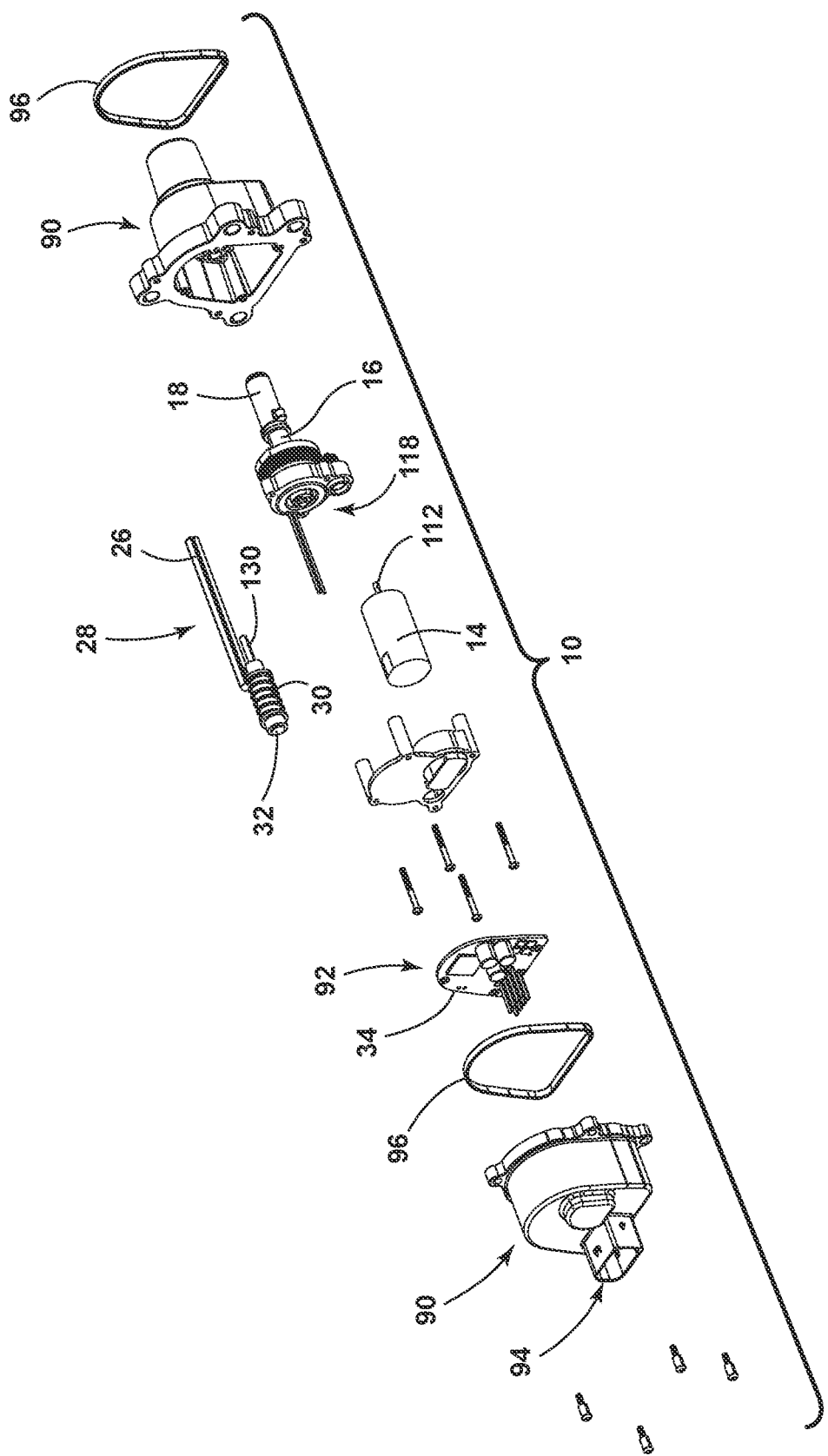
FIG. 9 is an exploded perspective view of the sway-bar actuator of FIG. 4.
Figure 10:
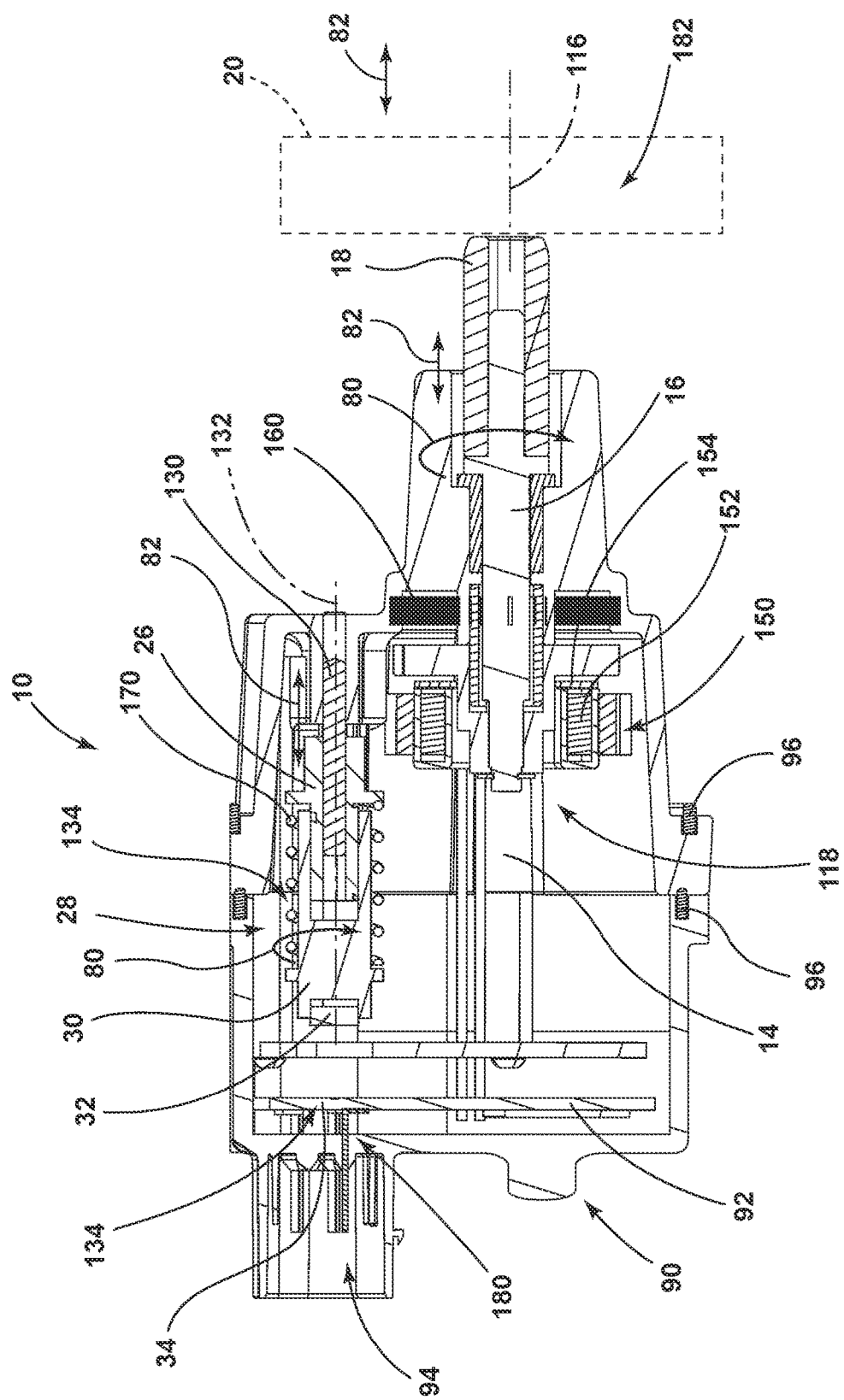
FIG. 10 is a cross-sectional view of the sway-bar actuator of FIG. 5 taken along line X-X.
Figure 11:
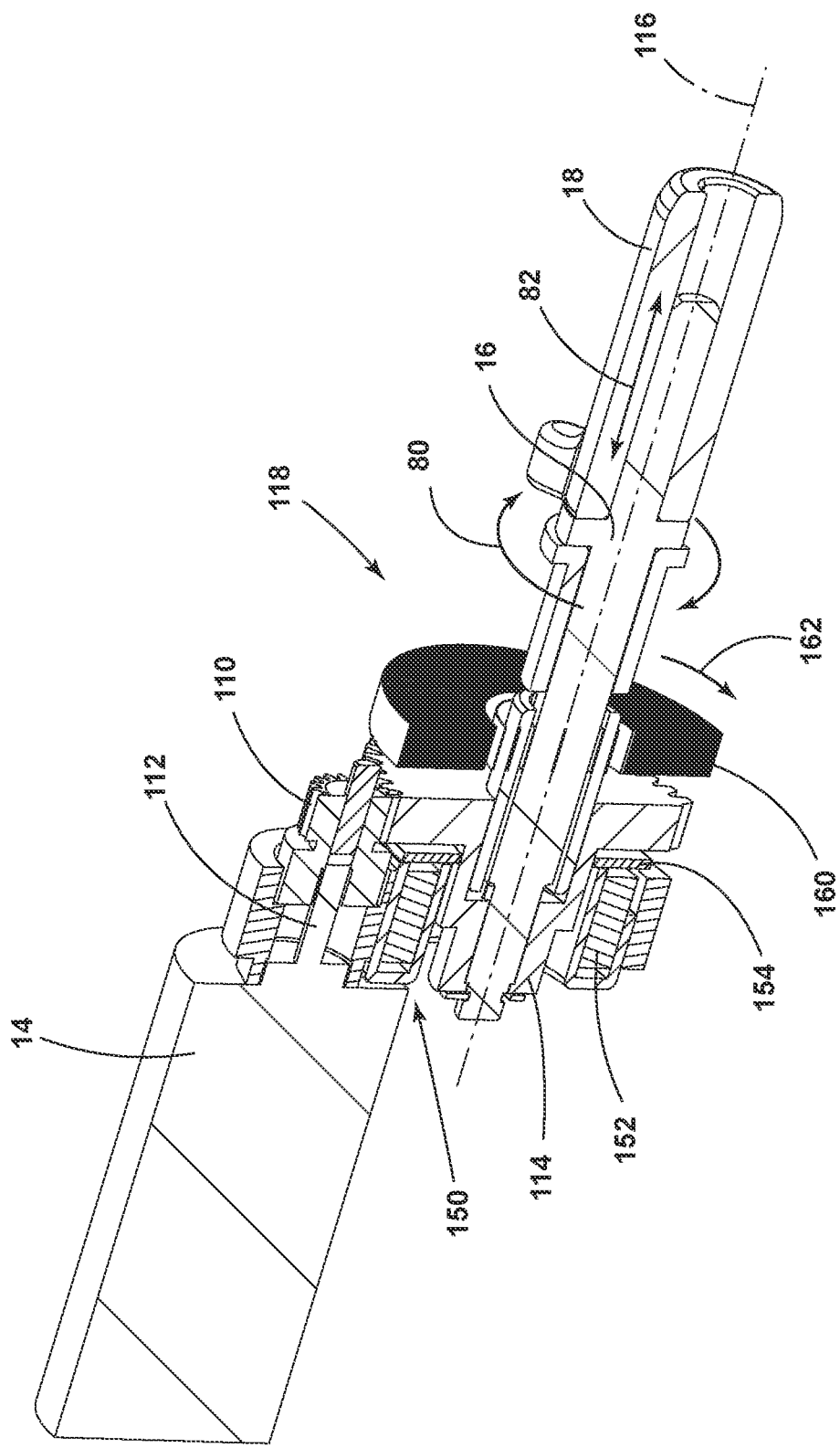
FIG. 11 is a perspective cross-sectional view of a drive assembly of the sway-bar actuator.

As exemplified in FIGS. 1-3, the suspension system for a vehicle includes the sway bar 12 that is operable between the engaged and disengaged positions 22, 24. The sway bar 12 includes opposing stabilizing bars 50 that meet at a collar assembly 52. The collar assembly 52 includes opposing bar gears 54 and a collar 56 that slides over the opposing bar gears 54 to define the engaged and disengaged positions 22, 24. In the engaged position 22, the collar 56 is grooved or keyed to slidably engage the opposing bar gears 54. This keyed slidable engagement to the engaged position 22 serves to rotationally fix the opposing stabilizing bars 50 with respect to one another to define a unified rotational operation of the sway bar 12 so that rotational forces within the opposite sides of the suspension system of the vehicle can be absorbed by the sway bar 12 as the vehicle turns. In the disengaged position 24, the collar 56 slides to disengage and rotationally release the two opposing stabilizing bars 50 so that they operate independently. This independent operation prevents the transfer of rotational forces from one side of the suspension system to the other side of the suspension system for the vehicle.

According to various aspects of the device, the sway-bar actuator 10 can be activated through a user interface 70 disposed within a passenger cabin of the vehicle. The operator of the vehicle or the passenger can engage the user interface 70 to activate the motor 14 for the sway-bar actuator 10. When activated, the motor 14 rotationally operates the lead rod 16. The lead rod 16 and the push rod 18 define a threaded or other similar rotational engagement. As the lead rod 16 undergoes a rotational operation 80, this rotation produces a corresponding and typically proportional axial operation 82 of the push rod 18. The push rod 18 is attached to the attachment fork 20. Accordingly, the rotational operation 80 of the motor 14 produces an axial operation 82 of the push rod 18 which, in turn, translates the attachment fork 20 along the engagement mechanism for the sway bar 12. Typically, the attachment fork 20 is coupled to the collar 56 of the sway bar 12, and the attachment fork 20 translates the collar 56 between the engaged and disengaged positions 22, 24. In certain aspects of the device, the engaged position 22 and the disengaged position 24 are approximately 10 millimeters apart. Other distances are contemplated.

The sway-bar actuator 10 can include an outer housing 90 with a printed circuit board (PCB) 92 affixed thereto. The outer housing 90 can include a connector 94 that attaches the user interface 70, as well as a power source to the sway-bar actuator 10. The outer housing 90 can include various housing components and various gaskets 96 that operate to seal the interior components of the sway-bar actuator 10 from the exterior environment.

Referring now to FIGS. 9-14, a pinion gear 110 is attached to the drive shaft 112 of the motor 14. When the motor 14 is actuated, the drive shaft 112 rotates the pinion gear 110 and, in turn, rotates the drive gear 114 for the drive assembly 118 of the sway-bar actuator 10. This pinion gear 110 and the drive gear 114 can be used to modify the rotational output to produce a mechanical advantage. Accordingly, the motor 14 can be a relatively low power motor. The pinion gear 110 and the drive gear 114 can produce various gear ratings, which can include, but are not limited to, a 4:1 gear ratio. The drive gear 114 is attached to the lead rod 16, and the lead rod 16 rotates about a pin rotational axis 116. As the lead rod 16 rotates about the pin rotational axis 116, this produces an axial translation, or axial operation 82, of the push rod 18 along the pin rotational axis 116. This translational and axial operation 82 of the push rod 18 operates the attachment fork 20 between engaged and disengaged positions 22, 24.

The sensor assembly 28 includes the sensor rod 26 that is also attached to the attachment fork 20. Translation of the attachment fork 20 through operation of the drive assembly 118 also generates an axial operation 82 within the sensor assembly 28. The sensor rod 26 translates between the engaged and disengaged positions 22, 24 and slides along a guide pin 130 within the sensor assembly 28. The sensor assembly 28 includes a rotator 30 that includes a threaded relationship between components of the sensor assembly 28. In this manner, as the sensor rod 26 moves in an axial operation 82 along a sensor rotational axis 132, and in an axial direction, this axial operation 82 translates to rotational operation 80 of the rotator 30 about the sensor rotational axis 132. This rotation of the rotator 30 produces a similar rotational operation 80 of the sensor magnet 32 relative to the encoder 34. This positioning of the sensor magnet 32 and the encoder 34 senses the rotational position 134 and the axial position 182 of the sensor assembly 28 and determines whether the attachment fork 20 is in the engaged or disengaged position 22, 24, or some position therebetween. Through this configuration, the relationship between the sensor magnet 32 and the encoder 34 operates to engage and disengage the motor 14 of the drive assembly 118.

Stated differently, when the user activates the drive assembly 118 for the sway-bar actuator 10, the motor 14 operates the drive assembly 118 to axially operate the attachment fork 20 to the disengaged position 24. The sensor assembly 28 monitors the position of the attachment fork 20 and converts this axial motion into a rotational motion between the sensor magnet 32 and the encoder 34. When the attachment fork 20 is in the disengaged position 24, this corresponds to a particular rotational relationship between the sensor magnet 32 and the encoder 34. When in this position, the encoder 34 instructs the motor 14, typically via a controller, to stop operation as the attachment fork 20 is now in the disengaged position 24.

Referring again to FIGS. 9-14, the drive assembly 118 can include an electromagnetic securing assembly 150 having an electromagnet 152 and a clutch disk 154 that is in selective communication with the drive gear 114. Activation of the electromagnet 152 biases the clutch disk 154 against the drive gear 114 and secures the drive gear 114 in a predetermined rotational position 134. Using this electromagnetic securing assembly 150, the motor 14 can deactivate when the attachment fork 20 is in the disengaged position 24. In this position, the electromagnet 152 can become energized and secure the clutch disk 154 against the drive gear 114 to prevent rotation of the drive gear 114 away from the disengaged position 24. Accordingly, the clutch disk 154 maintains the rotational position 134 of the lead rod 16 and the axial position 182 of the attachment fork 20 in the disengaged position 24, rather than the motor 14.

Referring again to FIGS. 9-11, the drive assembly 118 can include a clock spring 160 that is coupled with the drive gear 114. When the motor 14 of the drive assembly 118 is activated, the motor 14 rotates the drive gear 114 and the lead rod 16, which results in the translation of the push rod 18. During this axial operation 82 of the push rod 18 in an outward direction that places the attachment fork 20 in the disengaged position 24, the contemporaneous rotational movement of the lead rod 16 and the drive gear 114 winds the clock spring 160 to a biasing position. As the clock spring 16 is wound, the clock spring 16 gains a biasing force 162 that is exerted in the opposite rotational direction. This biasing force 162 operates to return the push rod 18 and the attachment fork 20 to the engaged position 22. As discussed above, the drive gear 114 is maintained in the disengaged position 24 through the activation of the electromagnet 152 and the clutch disk 154. When the clutch disk 154 is disengaged through a de-energization of the electromagnet 152, the biasing force 162 that has been transferred into the clock spring 160 biases the lead rod 16 to rotate about the pin rotational axis 116. This rotational biasing force 162 rotates the lead rod 16 and translates the push rod 18 back toward the engaged position 22. Through this configuration, it is contemplated that the motor 14 can be a one-way motor that operates the drive gear 114 in a single direction. The clock spring 160 can account for the movement of the drive gear 114, and the remainder of the drive assembly 118 back to the engaged position 22. Similarly, the biasing force 162 exerted by the clock spring 160 can assist the motor 14, which can also be a two-way motor, to rotate the lead rod 16 and translate the push rod 18 back to the engaged position 22.

Referring again to FIGS. 9-14, the engagement between the lead rod 16 and the push rod 18 and also between the sensor rod 26 and the rotator 30 can define a generally helical or screw-type interface. This helical interface generated a structural relationship that allows for a modulation of rotational operation 80 into an axial operation 82, or vice versa. As discussed above, rotation of the motor 14 is modulated through the rotational operation 80 of the lead rod 16 into the axial operation 82 of the push rod 18. Similarly, the axial operation 82 of the sensor rod 26 is modulated into a rotational operation 80 of the rotator 30 that, in turn, rotates the sensor magnet 32 relative to the encoder 34.

Referring again to FIGS. 9-14, the sensor assembly 28 can include a biasing spring 170 that biases the sensor rod 26 away from the rotator 30. In this manner, when the attachment fork 20 is operated away from the drive assembly 118, the spring of the sensor assembly 28 similarly biases the sensor rod 26 toward the attachment fork 20 to operate along with the attachment fork 20. Accordingly, as the biasing spring 170 biases the sensor rod 26 away from the PCB 92 and the encoder 34, the rotator 30 experiences a rotational operation 80 about the sensor rotational axis 132. This, in turn, rotates the sensor magnet 32 relative to the encoder 34.

Referring again to FIGS. 12-14, the use of the single sensor magnet 32 and the encoder 34 provides a single sensor interface 180 that monitors the axial position 182 of the attachment fork 20 by measuring a rotational position 134 of the sensor magnet 32 relative to the encoder 34. Using this configuration, a single sensor magnet 32 is capable of providing a precise measurement regarding the positioning of the attachment fork 20 relative to the sway bar 12.

In conventional sway bar assemblies, multiple sensors are utilized for assessing the position of an attachment fork. These multiple sensors provide opportunities for systemic failure and miscommunication between the various sensors. The multiple sensors also define a much more complicated assembly in terms of mechanisms and algorithms.

Figure 12:
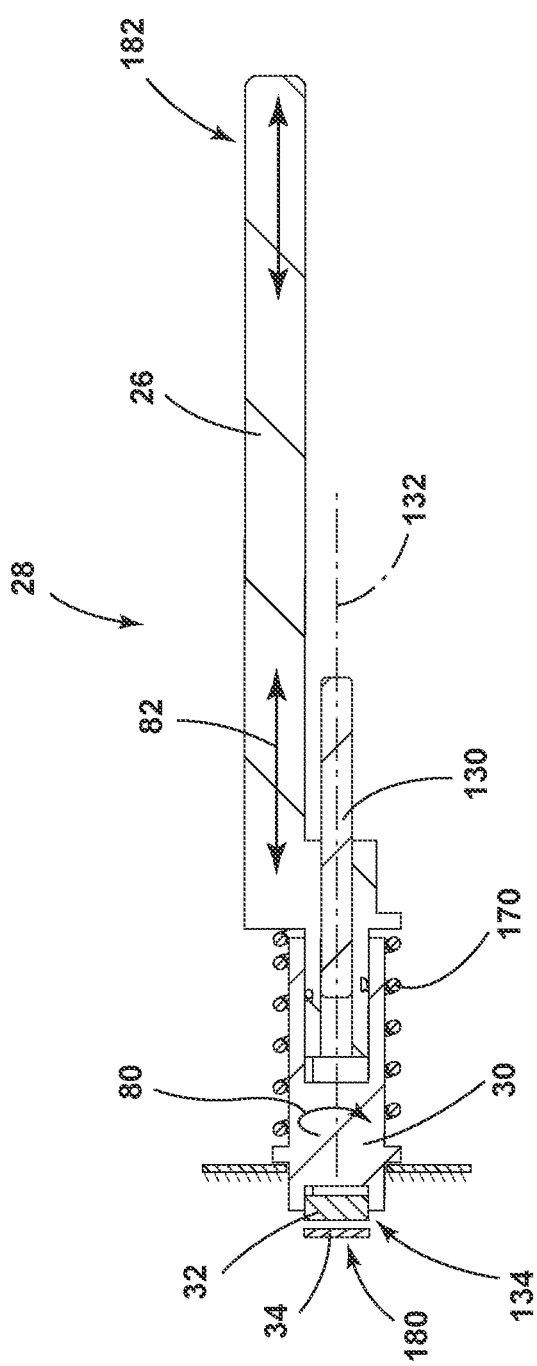
FIG. 12 is a schematic cross-sectional view of a sensor assembly for the sway-bar actuator.
Figure 13:
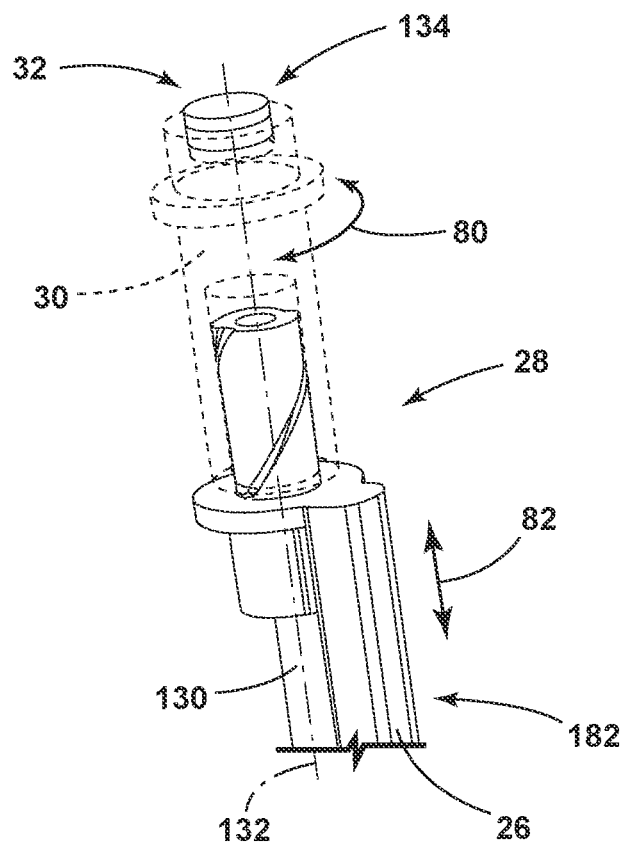
FIG. 13 is a schematic perspective view of an aspect of the sensor assembly.
Figure 14:
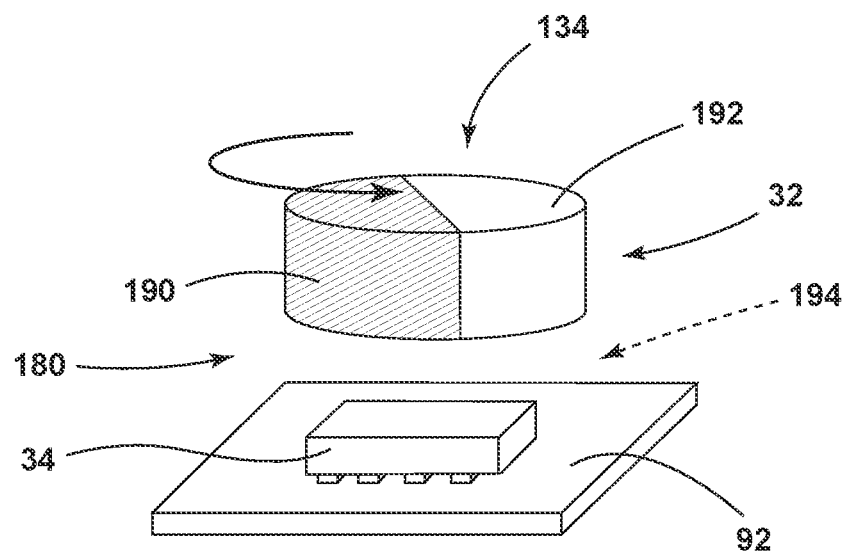
FIG. 14 is a schematic diagram illustrating operation of the sensor magnet and the positioning encoder.

In the present device, as exemplified in FIGS. 12-14, the single sensor magnet 32, typically having a single magnetic north pole 190 and a single magnetic south pole 192, provides a rotational operation 80 that manipulates a magnetic field 194 relative to the encoder 34. The encoder 34 is adapted to monitor the rotational position 134 of the magnet field for the sensor magnet 32 to determine the rotational position 134 of the sensor magnet 32 and, in turn, the axial position 182 of the sensor rod 26 and the attachment fork 20.

By monitoring the position of the attachment fork 20 via the sensor rod 26, the encoder 34 can communicate with the motor 14 to activate and deactivate the motor 14, depending upon the positioning of the attachment fork 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A sway-bar actuator for a vehicle suspension, the sway bar actuator comprising:
    a motor that rotationally operates a lead rod, wherein rotation of the lead rod axially operates a push rod, wherein the lead rod is engaged with the motor via a drive gear;
    an attachment fork, wherein operation of the push rod axially operates the attachment fork between an engaged position and a disengaged position, wherein the engaged position is characterized by a unified operation of opposing stabilizing bars, and wherein the disengaged position is characterized by independent rotational operation of the opposing stabilizing bars;
    a sensor rod coupled to the attachment fork, wherein the sensor rod operates axially with the attachment fork
    an electromagnetic securing assembly having an electromagnet and a clutch disk in selective communication with the drive gear, wherein activation of the electromagnet biases the clutch disk against the drive gear and secures the drive gear in a predetermined rotational position;
    a clock spring, wherein rotational operation of the lead rod and the attachment fork toward the disengaged position winds the clock spring to a biasing position, and wherein a biasing force of the clock spring rotationally operates the lead rod and returns the push rod and the attachment fork to the engaged position;
    a sensor assembly having a rotator and a sensor magnet, wherein axial operation of the sensor rod produces a rotational operation of the sensor magnet; and
    an encoder, wherein a rotational position of the sensor magnet relative to the encoder corresponds to an axial position of the attachment fork and the push rod relative to the engaged and disengaged positions.

2. The sway-bar actuator of claim 1, further comprising a collar that is coupled with the attachment fork, wherein operation of the attachment fork to the engaged position engages the collar with each stabilizing bar of the opposing stabilizing bars.

3. The sway-bar actuator of claim 2, wherein operation of the attachment fork to the disengaged position operates the collar to engage only one stabilizing bar of the opposing stabilizing bars.

4. The sway-bar actuator of claim 1, wherein the encoder is positioned on a printed circuit board.

5. The sway-bar actuator of claim 4, wherein the printed circuit board includes a controller that is coupled with the motor, the sensor assembly and the encoder.

6. The sway-bar actuator of claim 1, wherein the sensor magnet includes a single magnetic north pole and a single magnetic south pole.

7. A sway-bar actuator for a vehicle suspension, the sway-bar actuator comprising:
    a motor;
    an attachment fork that is coupled with the motor, wherein rotational operation of the motor is translated to define an axial operation of the attachment fork between an engaged position, where opposing stabilizing bars are rotationally fixed with respect to one another, and a disengaged position, where the opposing stabilizing bars rotationally operate independent of one another;
    a sensor assembly having a rotator and a sensor magnet that are coupled with the attachment fork, wherein the axial operation of the attachment fork produces a rotational operation of the rotator and the sensor magnet;
    a sensor rod coupled to the attachment fork and the rotator, wherein the sensor rod operates axially with respect to the attachment fork and wherein the rotator rotationally operates with respect to the sensor rod; and
    an encoder, wherein a rotational position of the sensor magnet relative to the encoder corresponds to an axial position of the attachment fork relative to the engaged and disengaged positions, wherein the encoder is positioned on a printed circuit board and wherein the rotator includes a biasing spring that rotationally biases the rotator and, in turn, axially biases the sensor rod away from the printed circuit board and against the attachment fork.

8. The sway-bar actuator of claim 7, wherein the motor rotationally operates a drive gear and a lead rod, and wherein rotation of the lead rod axially operates a push rod and the attachment fork between the engaged and disengaged positions.

9. The sway-bar actuator of claim 8, further comprising an electromagnetic securing assembly having an electromagnet and a clutch disk in selective communication with the drive gear, wherein activation of the electromagnet biases the clutch disk against the drive gear and secures the drive gear in a predetermined rotational position.

10. The sway-bar actuator of claim 9, further comprising a clock spring, wherein rotational movement of the lead rod toward the disengaged position winds the clock spring to a biasing position, and wherein a biasing force of the clock spring in the biasing position rotationally biases the lead rod and further biases the push rod and the attachment fork to the engaged position.

11. The sway-bar actuator of claim 7, wherein the rotator and the sensor rod define a helical interface that translates axial motion of the sensor rod into rotational operation of the rotator and the sensor magnet.

12. The sway-bar actuator of claim 7, wherein the sensor magnet includes a single magnetic north pole and a single magnetic south pole.

13. A sway-bar actuator for a vehicle suspension, the sway-bar actuator comprising:
    a motor that rotationally operates a drive gear, wherein rotation of the drive gear axially operates a push rod;
    an attachment fork, wherein operation of the push rod axially operates the attachment fork between an engaged position and a disengaged position that rotationally fixes and rotationally releases opposing stabilizing bars, respectively;
    a clock spring, wherein rotational movement of the drive gear toward the disengaged position winds the clock spring to a biasing position, and wherein a biasing force of the clock spring rotationally operates the drive gear and returns the push rod to the engaged position;
    an electromagnetic securing assembly having an electromagnet and a clutch disk in selective communication with the drive gear, wherein activation of the electromagnet biases the clutch disk against the drive gear and secures the drive gear in a predetermined rotational position, and also selectively secures the attachment fork in one of the engaged position and the disengaged position;

a sensor rod coupled to the attachment fork, wherein the sensor rod operates axially with the attachment fork;

a sensor assembly having the sensor rod, a rotator and a sensor magnet, wherein the sensor rod operates axially with the attachment fork and wherein axial operation of the sensor rod produces a rotational operation of the rotator and the sensor magnet; and an encoder, wherein a rotational position of the sensor magnet relative to the encoder corresponds to an axial position of the attachment fork and the push rod relative to the engaged position and the disengaged position.

14. The sway-bar actuator of claim 13, wherein the rotator includes a biasing spring that biases the sensor rod against the attachment fork, and wherein the sensor rod and the rotator define a helical interface that translates axial operation of the sensor rod into rotational operation of the rotator and the sensor magnet.

* * * * *

UNITED STATES PATENT AND TRADEMARK OFFICE
CERTIFICATE OF CORRECTION

| | |
|---|---|
| PATENT NO. | : 11,648,814 B2 |
| APPLICATION NO. | : 17/516995 |
| DATED | : May 16, 2023 |
| INVENTOR(S) | : Rosinski |

It is certified that error appears in the above-identified patent and that said Letters Patent is hereby corrected as shown below:

In the Specification

Column 2, Line 36:
"fora" should be – for a –

Signed and Sealed this
Twenty-eighth Day of November, 2023

Katherine Kelly Vidal
*Director of the United States Patent and Trademark Office*